United States Patent
Lavikko et al.

(10) Patent No.: US 11,829,827 B2
(45) Date of Patent: Nov. 28, 2023

(54) DOCUMENT AND A METHOD FOR MANUFACTURING A DOCUMENT

(71) Applicant: Confidex Oy, Tampere (FI)

(72) Inventors: Petteri Lavikko, Tampere (FI); Pierre Chadebech, Tampere (FI); Alvin Chen, Guangzhou (CN); Eveliina Koski, Tampere (FI)

(73) Assignee: Confixdex Oy, Tampere (FI)

( * ) Notice: Subject to any disclaimer, the term of this patent is extended or adjusted under 35 U.S.C. 154(b) by 0 days.

(21) Appl. No.: 17/599,738

(22) PCT Filed: Apr. 17, 2019

(86) PCT No.: PCT/CN2019/082987
§ 371 (c)(1),
(2) Date: Sep. 29, 2021

(87) PCT Pub. No.: WO2020/210997
PCT Pub. Date: Oct. 22, 2020

(65) Prior Publication Data
US 2022/0164623 A1    May 26, 2022

(51) Int. Cl.
*G06K 19/077* (2006.01)
(52) U.S. Cl.
CPC . *G06K 19/07737* (2013.01); *G06K 19/07726* (2013.01); *G06K 19/07773* (2013.01); *G06K 19/07798* (2013.01)
(58) Field of Classification Search
CPC ....... G06K 19/07737; G06K 19/07726; G06K 19/07773; G06K 19/07798; G06K 19/07309; G06K 19/07786
See application file for complete search history.

(56) References Cited

U.S. PATENT DOCUMENTS

| | | | | |
|---|---|---|---|---|
| RE16,412 E | * | 8/1926 | Schwartz | B42D 15/00 283/52 |
| 2,223,089 A | * | 11/1940 | Beuglet | B42D 5/002 283/105 |
| 4,512,595 A | * | 4/1985 | Breen | B42D 25/29 462/55 |
| 9,594,992 B1 | * | 3/2017 | Lai | G06K 19/08 |

(Continued)

FOREIGN PATENT DOCUMENTS

| CN | 101084513 | 12/2007 |
|---|---|---|
| CN | 202929654 | 5/2013 |

(Continued)

OTHER PUBLICATIONS

CN106951932A, Induction ticket and ticket monitoring system, English machine translation, 7 pages (Year: 2022).*

(Continued)

*Primary Examiner* — Tuyen K Vo
(74) *Attorney, Agent, or Firm* — Leason Ellis LLP

(57) ABSTRACT

The present invention relates to a document comprising at least one RFID transponder, the RFID transponder comprising an antenna (3, 23) and an integrated circuit (4, 24) electrically coupled to the antenna (3, 23). The document comprises at least one detachable detuning element (7, 27) electrically coupled to the antenna (3, 23). The invention also relates to a method for manufacturing a document comprising an RFID transponder.

8 Claims, 2 Drawing Sheets

(56) References Cited

U.S. PATENT DOCUMENTS

| | | | |
|---|---|---|---|
| 10,417,551 B2 * | 9/2019 | Matsuda | G06K 19/07798 |
| 2007/0152829 A1 * | 7/2007 | Lindsay | G06K 19/07345 |
| | | | 340/10.2 |
| 2007/0193095 A1 * | 8/2007 | Eisenberg | G09F 1/10 |
| | | | 40/700 |
| 2019/0164030 A1 * | 5/2019 | Lai | G06K 19/0717 |

FOREIGN PATENT DOCUMENTS

| | | | |
|---|---|---|---|
| CN | 106951932 | | 7/2017 |
| GB | 2547481 A | | 8/2017 |
| JP | 2000326672 A | * | 11/2000 |
| JP | 2006099535 A | * | 4/2006 ....... G06K 19/07345 |

OTHER PUBLICATIONS

CN101084513A, RFID tag, English machine translation, 7 pages (Year: 2022).*

JP2006099535A, Sheet-shaped product equipped with non-contact recognition device, English machine translation, 6 pages. (Year: 2022).*

JP2000326672A, Ticket and ticket issuing machine, English machine translation, 7 pages (Year: 2022).*

European Search Report in EP Application No. 19925017.6-1205/3956817, dated Oct. 26, 2022 (6 pages).

* cited by examiner

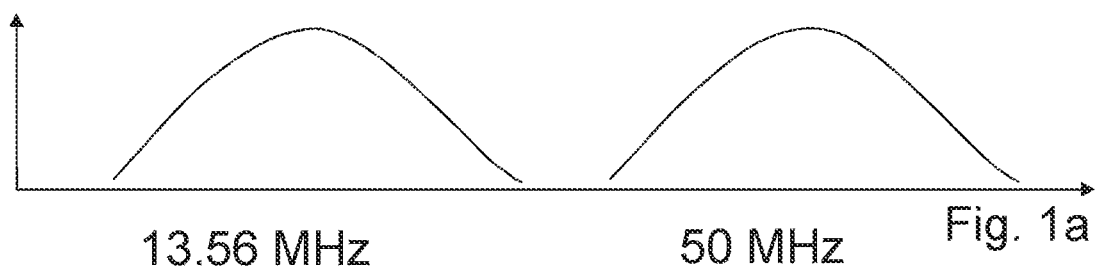
13.56 MHz    50 MHz    Fig. 1a
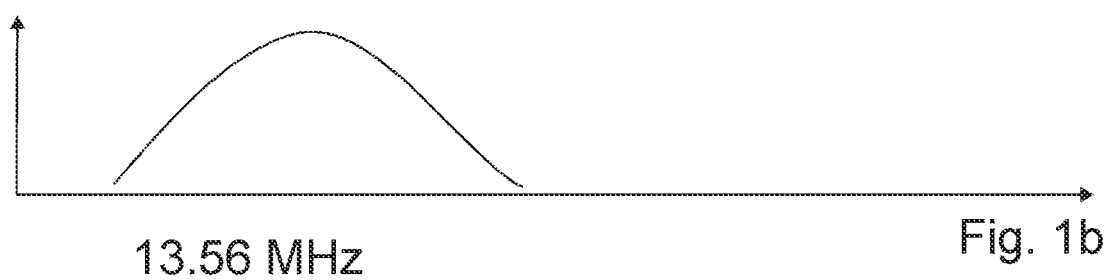
13.56 MHz    Fig. 1b
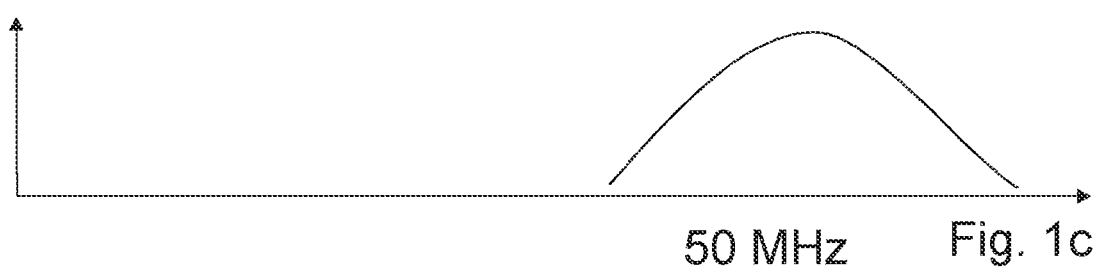
50 MHz    Fig. 1c
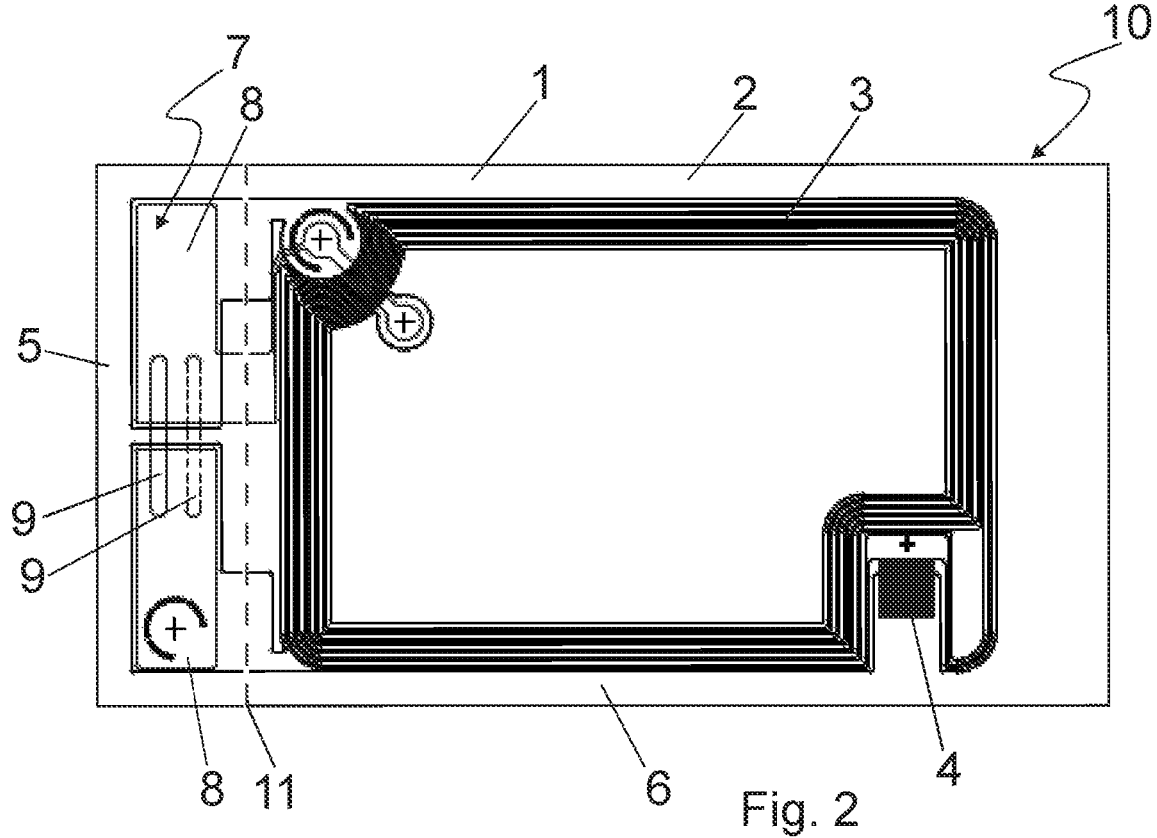
Fig. 2

DOCUMENT AND A METHOD FOR MANUFACTURING A DOCUMENT

CROSS-REFERENCE TO RELATED PATENT APPLICATIONS

This application is a U.S. National Phase Application under 35 U.S.C. § 371 of International Patent Application No. PCT/CN2019/082987, filed Apr. 17, 2019, which is incorporated by reference as if expressly set forth in its entirety herein.

FIELD OF THE INVENTION

The present invention relates to a document, which comprises at least one RFID transponder. The RFID transponder comprises an antenna and an integrated circuit electrically coupled to the antenna. The present invention also relates to a method for manufacturing a document comprising an RFID transponder. The RFID transponder is adapted to function at a first frequency.

BACKGROUND OF THE INVENTION

Documents comprising RFID transponders, such as tickets, can be manufactured in a manufacturing site as electrically empty documents without electrical encoding, or electrically fully encoded documents with predefined data. The electrically fully encoded documents may include fares and the like so that the document is ready for use. The electrically empty documents, such as tickets, are encoded with information, such as information concerning fares, either in automatic ticket vending machines on stations or on a point of sales by ticket encoding and printing machines. The ticket is finalized just before an end user gets the ticket and he can be sure that the ticket has not been used or manipulated. When the document is preloaded e.g. with fares in the manufacturing site an end user can buy a ticket, which is ready for use, from a place where there is no possibilities for final encoding. Such places may be kiosks or supermarkets.

If the ticket is already ready for use in the manufacturing site, there is a possibility that when the end user gets the ticket, someone may have used the ticket or somehow changed the memory content. In that case the end user does not get a product which he had intended to buy. For example, it is possible that the first and last tickets in ticket books have been used by someone else before they are sold. Further, it is also possible that an end user complains that a ticket is unusable in order to avoid buying a ticket although he has already used the ticket about which he complains.

Most of the contactless documents are not shielded and they are instantly ready for use. Further, available shielding methods are expensive and difficult to use so that they do not provide any additional value with affordable money. Thus, the expensive technology has prevented the shielding methods to penetrate into the market.

In practice, there is only one method to shield an RFID product in the field conditions which is based on isolating the product from the environment by covering the full product by a metal layer. It can be e.g. a thin aluminum bag or an aluminum box, which prevents the electromagnetic coupling between an RFID reader and the product. Even 50 µm thin aluminum layer is able to prevent the coupling with the reader. If there is any antenna part electrically visible below the metal layer, the coupling may take place. Therefore, the product must be covered fully by a metal layer which is challenging. Covering only one side with the metal layer is not enough to prevent the electromagnetic coupling if there is any space between the antenna and the metallic shielding layer.

BRIEF DESCRIPTION OF THE INVENTION

An object of the present invention is to provide a document and a method for manufacturing a document so as to overcome the above problems. The objects of the invention are achieved by a document and a method which are characterized by what is stated in the independent claims. The preferred embodiments of the invention are disclosed in the dependent claims.

An idea of the invention is to add an additional component to the antenna in order to prevent its normal operation. When the additional component is detached, the normal operation is restored. Word "detachable" means in this context that an electrical contact can be made inactive e.g. by means of tearing off, removing, or disconnecting the additional component. For example, one can tear off the additional component, or one can cut certain regions of the additional component so that the electrical contact breaks.

An advantage of the document of the invention is that the RFID transponder of the document is inactive in respect of a reader, which works at a first predetermined frequency, until the document is activated. However, the RFID transponder may be active at a second predetermined frequency. The first predetermined frequency may be, for example, a frequency that is used to identify tickets in public transport, or in mass events. The second predetermined frequency may be a frequency that is used to encode an integrated circuit of the RFID transponder. A further advantage is that it is easily noticeable whether the document has been activated or not. The document of the invention is also safe for people that take part in the retail chain since nobody can accuse about a misuse without a reason.

The document of the invention may be a card, a passport, a ticket, a ticket book, or any other document that comprises information, which have to be protected before the first use.

The document of the invention is preferably manufactured in a roll-to-roll manufacturing process. However, e.g. passports and cards may be manufactured in a sheet-to-sheet manufacturing process. The document may have a sandwiched structure, i.e. there are at least two material layers one upon the other, and the RFID transponder is hidden between the material layers. The material layers may be adhesively attached. Outer surfaces of the document, or at least one surface, may be printed and/or patterned.

The document comprises at least one RFID transponder that comprises an antenna and an integrated circuit electrically coupled to the antenna. A chip includes the integrated circuit. The integrated circuit may have galvanic, inductive or capacitive coupling to the antenna. The RFID transponder may work at any usable frequency but 13.56 MHz and UHF frequencies are preferred. In practice, the usable frequencies are restricted by prevailing standards.

The document comprises at least one additional component, i.e. detachable detuning element that is electrically coupled to the antenna. The detachable detuning element may be removable or disconnectable. The electrical coupling between the detuning element and the antenna may be a galvanic contact and/or a contact is established by a capacitive coupling. The electrical contact may be made by wiring formed on the substrate. The detuning element and the wiring may be made, for example, by etching, punching, or printing.

The detuning element of the document may comprise detuning patterns which are electrically connected with at least one fastener, for example a staple, so that the RFID transponder of the document is inactive in respect of the first frequency. An electrically conductive tape or a like can be used instead of an electrically conductive fastener.

The document may be a ticket book, which comprises a stack of tickets. The stack comprises at least two tickets. Each ticket of the ticket book may comprise a stub and a main ticket, which are releasably attached together. The stub and the main ticket may be separated by a tear line. Each ticket comprises an RFID transponder. The RFID transponder comprises an antenna and an integrated circuit electrically coupled to the antenna. Each ticket comprises at least one detachable detuning element electrically coupled to the antenna. The detachable tuning element may be formed on the stub.

The ticket book may comprise at least one electrically conductive fastener, such as an electrically conductive staple, which penetrates through the ticket book in such a manner that it electrically connects the detuning elements of the tickets of the ticket book.

When the document is manufactured, the RFID transponder is provided with at least one detuning element. The detuning element detunes the first frequency, at which the transponder is intended to function when an end user uses it, to the second frequency. The second frequency may be used for encoding the integrated circuit. When an end user detaches the detuning element e.g. by tearing it off from the document the RFID transponder of the document starts to function at the first predetermined frequency.

It is also possible that during manufacturing the document comprises a first detachable detuning element and a second detachable detuning element, which are electrically coupled to the antenna. When the first detuning element and the second detuning element are coupled to the antenna the RFID transponder of the document functions at the first predetermined frequency, or near it at a frequency that enables communication with a system designed for the predetermined first frequency. The integrated circuit may be encoded at this stage. After that the second detuning element is detached the RFID transponder functions at the second predetermined frequency, i.e. the RFID transponder is inactive in respect of the first frequency. When an end user detaches the first detuning element e.g. by tearing it off from the document the RFID transponder of the document starts to function at the first predetermined frequency.

BRIEF DESCRIPTION OF THE DRAWINGS

In the following the invention will be described in greater detail by means of preferred embodiments with reference to the attached drawings, in which FIGS. 1a to 1c show schematically an example of resonance frequencies of an RFID product.

FIG. 2 shows a document according to the invention;

DETAILED DESCRIPTION OF THE INVENTION

Figure 3:
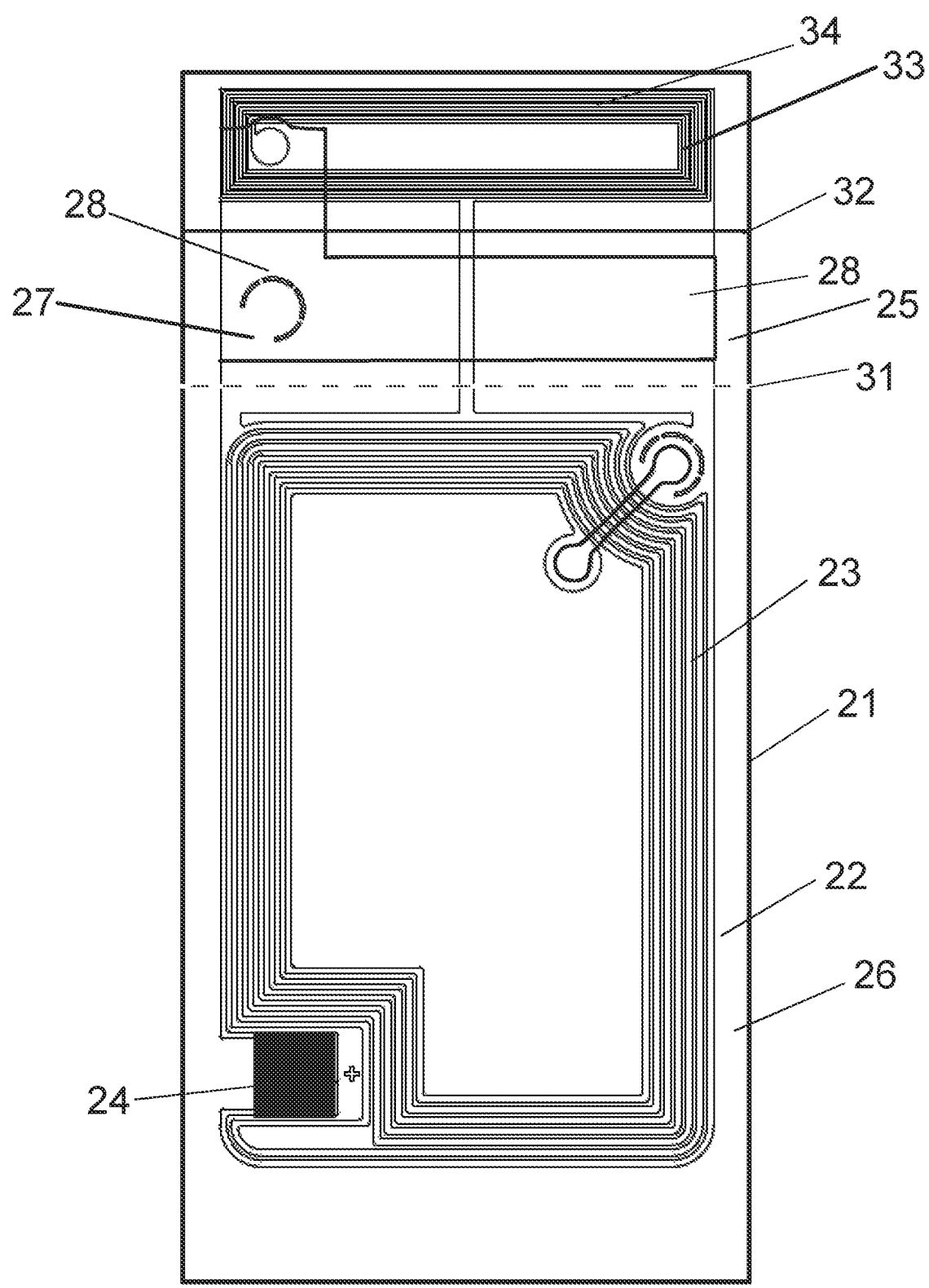
FIG. 3 shows a document at a production stage according to the invention.

FIGS. 1a to 1c show schematically an example of resonance frequencies of an RFID product. As shown in FIG. 1a, the product may work at a frequency of 13.56 MHz when it is in its end use. When the product is provided with a detuning element the frequency may shift, for example, to 50 MHz. As shown in FIG. 1b, the RFID product works normally at the frequency of 13.56 MHz when the detuning element is removed. As shown in FIG. 1c, the RFID product may work, for example, at the frequency of 50 MHz during the production of the RFID product. It is also possible that the RFID product is equipped with a removable second detuning element during production in order to operate at 13.56 MHz or close enough to 13.56 MHz in order to operate with a reader system designed for 13.56 MHz. A frequency near 13.56 MHz may mean a frequency between 5 to 35 MHz.

FIG. 2 shows an RFID product according to the invention. The RFID product is a ticket book 10, which comprises at least two individual tickets 1 stacked on each other. The ticket 1 comprises a substrate 2, an antenna 3 and an integrated circuit (chip) 4. The substrate 2 comprises a stub 5 and a main ticket 6. A detuning element 7 comprises electrically conductive detuning patterns 8 and at least one electrically conductive staple 9 (FIG. 2 shows two staples 9). The detuning element 7 is electrically coupled to the antenna 3. The detuning patterns 8 are electrically connected with the staples 9. The staples 9 connects electrically the tickets 1 of the ticket book 10 by penetrating through the detuning patterns 8 of each ticket 1. The ticket book 10 may be encoded at production stage with a reader designed to communicate at the second predetermined frequency.

When a user takes a single ticket 1 into use she/he tears the ticket 1 off the ticket book 10 and the stub 5 along a tear line 11. As the detuning element 7 and the antenna 3 are apart from each other the antenna begins to function at the first predetermined frequency which allows a reader to read the information stored in the chip 4 at the end user.

FIG. 3 shows a document according to the invention when it is in a production stage.

The ticket 21 comprises a substrate 22, an antenna 23 and an integrated circuit (chip) 24. The antenna 23 is electrically coupled to the integrated circuit 24.

A first detuning element 27 comprises a first detuning pattern 28. The first detuning element 27 is electrically coupled to the antenna 23.

A second detuning element 33 comprises a second detuning pattern 34. The second detuning element 33 is electrically coupled to the first detuning element 27 and the antenna 23.

When only the first detuning element 27 is electrically connected to the antenna 23 the resonance frequency is shifted to a second frequency, for example to 50 MHz. When the second detuning element 33 is in addition electrically connected to the antenna 23 and the first detuning element 27 the resonance frequency is shifted to the first frequency or near it, for example to 13.56 MHz or near 13.56 MHz.

The document in FIG. 3 can be encoded by a reader-encoder, which works at or near 13.56 MHz. After encoding the second detuning element 33 is removed along a line 32 so that the product returns to an inactive state in respect of the first frequency.

When a user takes the product into use she/he tears off the first detuning element 27 along a tear line 31 and the product starts to work at the first frequency which allows a reader to read the information stored in the chip 24.

It will be obvious to a person skilled in the art that, as the technology advances, the inventive concept can be implemented in various ways. The invention and its embodiments are not limited to the examples described above but may vary within the scope of the claims.

The invention claimed is:

1. A document comprising at least one RFID transponder that is adapted to function at a first frequency of 13.6 MHz, the RFID transponder comprising an antenna and an integrated circuit electrically coupled to the antenna (3, 23), wherein the document comprises at least one detachable detuning element electrically coupled to the antenna that deactivates the RFID transponder to function at the first frequency of 13.56 MHz.

2. The document according to claim 1, wherein the document is a card, a passport, or a ticket.

3. The document according to claim 1, wherein the document comprises at least one electrically conductive fastener or an electrically conductive tape that is configured to electrically connect detuning patterns of the document.

4. The document according to claim 1, wherein the document is a ticket book.

5. The document according to claim 4, wherein the ticket book comprises a stack of tickets, the stack of tickets comprises at least two tickets, each ticket comprises an RFID transponder and the RFID transponder comprises an antenna and an integrated circuit electrically coupled to the antenna, each ticket comprises at least one detachable detuning element electrically coupled to the antenna.

6. The document according to claim 5, wherein each ticket of the ticket book comprises a stub and a main ticket which are releasably attached together, the stub being provided with the at least one detuning element.

7. The document according to claim 5, wherein the ticket book comprises at least one electrically conductive fastener that is configured to electrically connect the detuning elements of the tickets of the ticket book.

8. A method for manufacturing a document comprising an RFID transponder, the RFID transponder comprising an antenna and an integrated circuit electrically coupled to the antenna, the RFID transponder being adapted to function at a first frequency, wherein the method comprises providing the RFID transponder with a first detuning element in order to detune the first frequency, at which the RFID transponder is adapted to function, to a second frequency, providing the RFID transponder with a second detuning element in order to detune the second frequency to the first frequency or to a frequency at which the RFID transponder operates in similar way as at the first frequency, encoding the RFID transponder by using the first frequency or a frequency at which the RFID transponder operates in similar way as at the first frequency, the first and second detuning elements being electrically coupled to the antenna during encoding the RFID transponder, removing the second detuning element after encoding the RFID transponder.

* * * * *

UNITED STATES PATENT AND TRADEMARK OFFICE
CERTIFICATE OF CORRECTION

PATENT NO. : 11,829,827 B2
APPLICATION NO. : 17/599738
DATED : November 28, 2023
INVENTOR(S) : Petteri Lavikko et al.

It is certified that error appears in the above-identified patent and that said Letters Patent is hereby corrected as shown below:

On the Title Page

Item [73], "Confixdex Oy, Tampere (FI)" should be "Confidex Oy, Tampere (FI)"

Signed and Sealed this
Thirteenth Day of February, 2024

Katherine Kelly Vidal
*Director of the United States Patent and Trademark Office*